United States Patent
Fontana et al.

[11] Patent Number: 6,167,564
[45] Date of Patent: Dec. 26, 2000

[54] SOFTWARE SYSTEM DEVELOPMENT FRAMEWORK

[75] Inventors: James Albert Fontana, Mission Viejo; Sridhar Srinivasa Iyengar, Irvine; Anthony Reginald Pitchford, Mission Viejo; Norman Roy Smith, Lake Forest; Douglas Marshall Tolbert, Newport Beach, all of Calif.

[73] Assignee: Unisys Corp., Blue Bell, Pa.

[21] Appl. No.: 09/156,028

[22] Filed: Sep. 17, 1998

[51] Int. Cl.$^7$ .................................................. G06F 9/45
[52] U.S. Cl. .............................. 717/1; 717/2; 717/11
[58] Field of Search ................................. 717/1, 2, 11

[56] References Cited

U.S. PATENT DOCUMENTS

| | | | |
|---|---|---|---|
| 5,977,967 | 11/1999 | Berner et al. | 345/335 |
| 6,018,627 | 1/2000 | Iyengar et al. | 717/1 |
| 6,023,578 | 3/2000 | Birsan et al. | 717/2 |
| 6,038,393 | 3/2000 | Iyengar et al. | 717/1 |
| 6,049,673 | 4/2000 | McComb et al. | 717/11 |
| 6,052,525 | 4/2000 | Carlson et al. | 717/1 |
| 6,071,317 | 6/2000 | Nagel | 717/11 |

OTHER PUBLICATIONS

Fitzgerald, A.; "Enterprise Resource Planning (ERP)–Breakthrough or buzzword?". IEEE/IEE Electronic Library[online], Factory 2000, pp291–297, Apr. 1992.

Ludwig et al.; "An Organizational Framework for Mass–Customized Business Applications". IEEE/IEE Electronic Library[online], Proceedings of the Second Euromicro Conference on Software Maintenance and Reengineering, pp 37–43, Mar. 1998.

Perez, J.; "Oracle links repositories; project Sedona offers Single view of components from multiple tools". PC Week, v14, n20, pp 1–3, May 1997.

PR Newswire; "Ross Systems Releases SAM 3.1, Accelerates Enterprise System Implementation". PR Newswire, p0603ATTU007, Jun. 1997.

Lee et al.; "Analyzing Business Domain: A Methodology and Repository System". IEEE/IEE[online], Hawaii International Conference on System Science, v3, pp 409–419, Jan. 1998.

Aiken et al,; "A framework for reverse engineering DoD legacy information systems", IEEE/IEE[online], Conference on Reverse Engineering, pp 180–191, May 1993.

Kozaczynski, W.; "Architecture Framework for Business Components". IEEE/IEE[online], Conference on Software Reuse, pp 300–307, Jun. 1998.

(List continued on next page.)

*Primary Examiner*—Tariq R. Hafiz
*Assistant Examiner*—Kelvin E. Booker
*Attorney, Agent, or Firm*—J. Ronald Richebourg; Mark T. Starr; Rocco L. Adornato

[57] ABSTRACT

A system and method in a computer system for integrating software development tools and applications into the computer system in order to build, deploy and maintain enterprise business process applications in a heterogeneous development framework. Integration of the applications and software development tools are achieved through integration of the key elements of the computer system which are business models, domain models and components. In the process of integration the origin of a first newly developed/modified/existing business model is traced to a first newly developed/modified/existing domain model and these models are linked together. Next, the constituent components of a second newly developed/modified/existing domain model are traced to a newly developed/modified/existing set of components created and linked together. The system also involves recovery of constituent components from a newly developed/modified/existing system in a first heterogeneous environment and those constituent components are reconstructed into usable components inside a third newly developed/modified/existing domain model and are linked together. The process also involves recovery of a fourth newly developed/modified/existing domain model from a second heterogeneous environment and linking it to a second newly developed/modified/existing business model.

1 Claim, 14 Drawing Sheets

OTHER PUBLICATIONS

Houston et al.; "Component–based development, CORBA and RM–ODP". IEEE/IEE[online], IEE Proceedings–Software, v145, iss1, pp 22–28, Feb. 1998.

Poulin et al.; "A Reuse–Based Software Architecture for Management Information Systems". IEEE/IEE[online], Conference on Software Reuse, pp 94–103, Apr. 1996.

Benjamin et al.; "A Framework for Adaptive Process Modeling and Execution(FAME)". IEEE/IEE[online], Workshops on Enabling Technologies: Infrastructure for Collaborating Enterprises, pp 3–9, Jun. 1998.

Iscoe, N.; "Domain Modeling–Overview and Ongoing Research at EDS". IEEE/IEE[online], International Conference on Software Engineering, pp 198–200, May 1993.

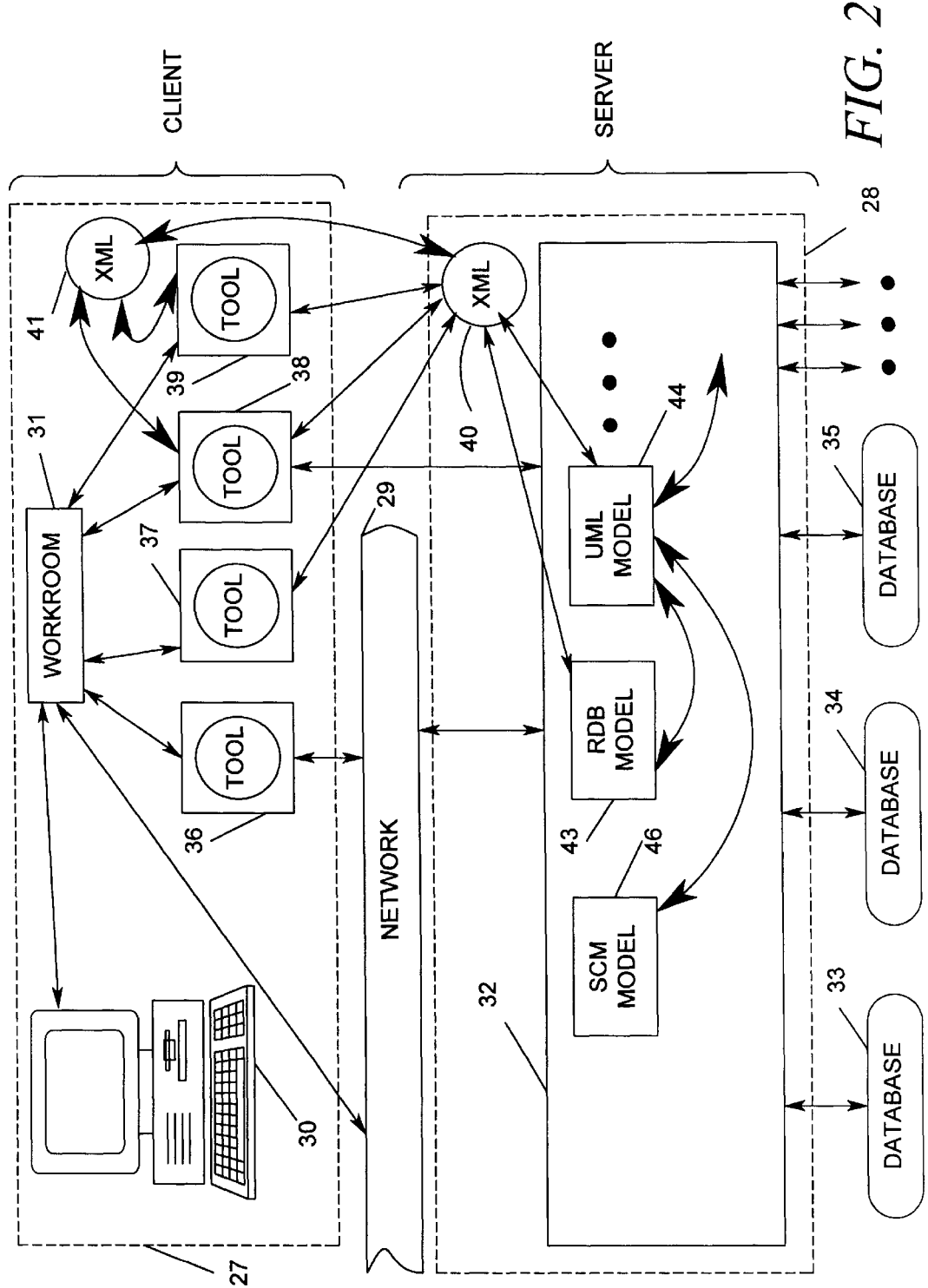

SOFTWARE SYSTEM DEVELOPMENT FRAMEWORK

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED APPLICATIONS

This patent document relates to the following co-pending applications, assigned to the same assignee hereof, which are incorporated herein by reference.

U.S. Ser. No. 09/154,613, entitled A METHOD AND SYSTEM FOR MONITORING AND CAPTURING ALL FILE USAGE OF A SOFTWARE TOOL;

U.S. Ser. No. 09/156,029, entitled A METHOD AND SYSTEM FOR INTERFACING TO A VARIETY OF SOFTWARE DEVELOPMENT TOOLS;

U.S. Ser. No. 09/156,027, entitled A METHOD AND SYSTEM FOR CONTROLLING AND TRACKING CLIENT ACCESS TO SERVER SOFTWARE; and, U.S. Ser. No. 09/156,026, entitled A METHOD AND SYSTEM FOR BUILDING COMPONENTS IN A FRAMEWORK USEFUL IN DEVELOPING INTEGRATED BUSINESS-CENTRIC APPLICATIONS.

FIELD OF THE INVENTION

The present invention generally relates to a system for integrating various software tools for a development framework, and more particularly to a system for third party tool integration for a development environment, which system supports the entire software life cycle including business process modeling, object modeling, component management, application development and deployment, and legacy integration.

BACKGROUND OF THE INVENTION

Windows NT is increasingly penetrating legacy environments, thereby creating a need to integrate existing applications with new applications based upon Windows NT. Accordingly, the complexity of developing and managing applications in heterogeneous environments is greatly increased. Moreover, software system development is moving away from an application-centered view to one that is centered on business processes. The starting point is a set of business process models, and the applications are then developed from the models. The result is a need for a comprehensive set of tools to abstract existing legacy systems into business models, and then to generate applications from those models.

Business process models define business processes; and, business processes describe activities that need to be performed within an organization. Examples of such activities may include processing purchase orders, payroll processing, or processing insurance claims. Actual software applications may be derived from business processes. These software applications, in conjunction with other software systems and a team of humans, may accomplish a defined business process.

Creation of business applications results in the need for a comprehensive environment that will support the entire business application development process. The process may start with the building of business models and progress to representing the business models as a collection of object models. Object models are a means for describing interactions between functions that are amenable to being automated in a computer system, and which collectively represent the functionality necessary to implement a business model.

The next step may include creating source code for the functions defined in the object model (business logic); that is, the creation of methods for the business processes that represent details of how the business runs. For example, if the business process is the handling of purchase orders, one function in the business process may be approval. The approval process may be represented as one part of an object model. Further, one detail about how this function is accomplished may be that purchase orders over $1,000 must be approved by a manager. Computer source code may be developed to implement the steps necessary to route purchase orders over $1,000 to a manager for approval. The development process may then proceed to building and wrapping components (reusable pieces of code), building applications from the components, and installing the new applications and components into the appropriate environments.

The development process results in a further need to discover legacy systems; that is, existing applications, components, business processes, or other legacy systems that must be discovered and integrated into new business models, which may in turn generate new business applications. The incorporation of existing legacy items into new applications will help preserve investments made in creating the legacy systems. A tool for performing the discovery of legacy systems is an example of one of the software tools capable of being integrated with other tools by the method and system of the present invention.

Current technology does not adequately address the needs for integrating various tools for use in a single environment that would support the process from beginning to end. Another shortcoming of existing technology is the inability to discover and reconstruct existing legacy items and incorporate them into new applications. Although there are tools that allow transformation of some legacy items into certain kinds of object models, these tools do not utilize the models to generate business applications. Furthermore, these tools are limited in their ability to abstract an object model from an existing software implementation, and are also not generalized, meaning that they are able to transform only certain types of legacy items into object models.

A further shortcoming of the current technology is that tools are usually inextricably linked to specific middleware, requiring the pairing of a specific tool with a specific middleware, when creating business applications. As an example of this shortcoming, if one tool is used to develop the business process model, one might be bound in the selection of the same tool to create the application source code for the model. The lack of tool independence is mainly due to the inability to exchange information between tools.

SUMMARY OF THE INVENTION

A system is provided in a computer system for integrating software development tools and applications into the computer system in order to build, deploy and maintain enterprise business process applications in a heterogeneous development framework. Integration of the applications and software development tools are achieved through integration of the key elements of the computer system which are business models, domain models and components. In the process of integration the origin of a first newly developed/modified/existing business model is traced to a first newly developed/modified/existing domain model and these models are linked together. Next, the constituent components of a second newly developed/modified/existing domain model are traced to a newly developed/modified/existing set of components created and linked together. The system also involves recovery of constituent components from a newly developed/modified/existing system in a first heterogeneous environment and those constituent components are reconstructed into usable components inside a third newly developed/modified/existing domain model and are linked together. The process also involves recovery of a fourth newly developed/modified/existing domain model from a second heterogeneous environment and linking it to a second newly developed/modified/existing business model.

It is an object of this invention to provide a system that lets users develop business process applications, where such system support legacy integration; and, support the entire software life cycle of (1) business process modeling; (2) object modeling; (3) component management; (4) application development; and, (5) application deployment.

Another object of the present invention is to provide a system that allows a user to develop business process applications with the use of heterogeneous tools.

Still another object of the present invention is to provide a system that integrates a variety of software tools, such as business modeling tools, component-modeling tools, component behavior tools and component wrapping tools.

Yet another object of the present invention is to provide a system that overcomes the prior art limitations of integrating only those tools from the same vendor, or the lack of functional scope for integrating newly developed tools, or the lack of tool interoperability.

An object of the present invention is to take existing software tools from a variety of vendors, and targeting a variety of middleware, and to integrate them into a coherent development framework in lieu of developing new tools.

A feature of the system of the present invention is the ability to trace the influence of an action of one tool on other tools, thereby making them interoperable and integrated.

Another feature of the system of the present invention is the ability to update other tools when an action is taken by a first tool.

Yet another feature of the system of the present invention is the ability to discover and reconstruct legacy programs.

An advantage of the system of the present invention is the ability to integrate the best of market software tools thereby providing a cooperative set of services under a unified framework. Hence, the user may focus on the development process and not be troubled with the integration or bridging of a variety of tools.

Still other objects, features and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects; all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts; and, which the drawings form a part of this application.

BRIEF DESCRIPTION OF THE DRAWINGS

FIG. 2 is a block diagram of the system of the present invention.

DETAILED DESCRIPTION OF ONE EMBODIMENT

Before proceeding with a description of the system of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit and byte-ordering and the transmission and error detection as well as correction of the bit stream. High-level protocols deal with message formatting, including the syntax of messages, the terminal to computer dialogue, character sets, sequencing of messages, etc.

The term schema as used herein refers to the logical description of data in a database, including definitions and relationships of data.

Figure 1:
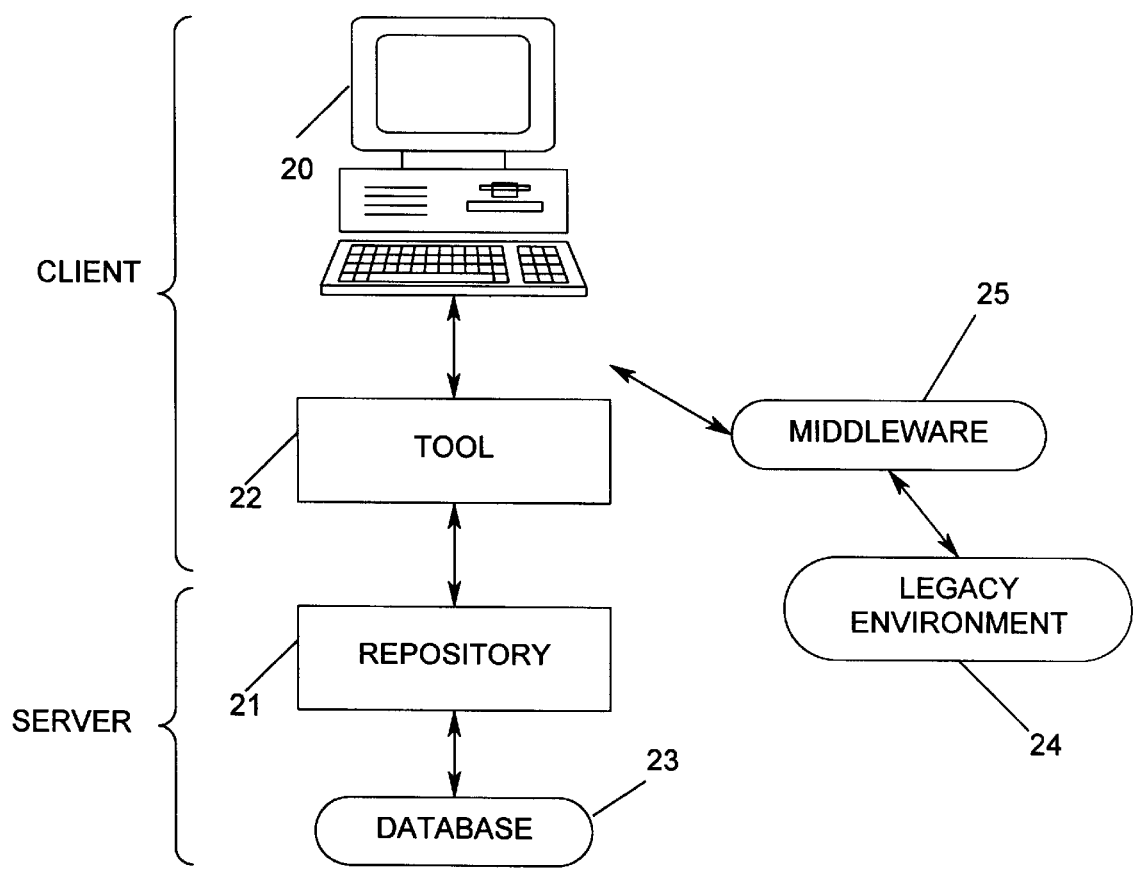
FIG. 1 is a block diagram of a prior art development system

Referring now to the drawings and FIG. 1 in particular, a block diagram of a system is shown of the prior art technique for execution of legacy programs in a Windows NT environment. Windows NT is a proprietary operating system of Microsoft Corporation of Redmond, WA. A user interface 20 is coupled to a repository 21 by means of a software tool 22. The tool 22 may have access to a legacy environment 24 by means of middleware 25, and the repository 21 may have access to a database 23.

The developer creating the tool 22 examines the description of the legacy environment 24, which is stored in the repository 21. Using the information obtained, the developer encodes into tool 22 a set of calls to middleware 25, which facilitate the required communication with the legacy environment 24. At run time, the tool 22 may contact the legacy environment 24 via the middleware 25 without reference to the information stored in the repository 21.

Referring now to FIG. 2, the system of the present invention is illustrated in block diagram form. For ease of understanding, the system is illustrated in two parts. First, there is a client 27 as bounded by a dashed line and a server 28, also as bounded by a dashed line. The client 27 and server 28 communicate with one another over a network 29. The network 29 may comprise any conventional network (e.g., TCP/IP), or the Internet.

A user interface 30, which may be the same or different from the user interface 20 depicted in FIG. 1, is coupled to a workroom 31 and both are shown as part of the client. The workroom 31 is a front end component of the system of the present invention and is coupled to the network 29, which is coupled to a repository 32.

In the disclosed embodiment, the repository 32 is a specialized, extensible object-oriented database application that adds value to a database system, which allows customization of a particular domain (such as application development) and it may be the same as the repository 21 depicted in FIG. 1. The repository 32 is coupled to databases 33, 34, 35, etc. for accessing modeling data stored therein.

The repository 32 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; U.S. Pat. No. 6,018,627, entitled TOOL-INDEPENDENT SYSTEM FOR APPLICATION BUILDING IN AN OBJECT ORIENTED DEVELOPMENT ENVIRONMENT WITH DATA STORED IN REPOSITORY IN OMG COMPLIANT UML REPRESENTATION; and, U.S. Pat. No. 6,038,393, entitled SOFTWARE DEVELOPMENT TOOL TO ACCEPT OBJECT MODELING DATA FROM A WIDE VARIETY OF OTHER VENDORS AND FILTER THE FORMAT INTO A FORMAT THAT IS ABLE TO BE STORED IN OMG COMPLIANT UML REPRESENTATION; each of which are hereby incorporated by reference as if set forth in full herein.

Tools 36 through 39 (within the client 27) are coupled to the workroom 31 and are disposed for performing a variety of tasks. For example, tool 36 may comprise a Visual Basic tool. Tool 36 is shown as being directly coupled to the network 29, which is linked to the repository 32. Tool 37 may comprise for example, Select Component Manager, which is available from Select Software Tools, Ltd. of Gloucestershire, U.K. Tool 38 may comprise for example, Select Enterprise, also available from Select Software Tools, Ltd. Tool 39 may comprise for example, Rational Rose, which is available from Rational Software Corporation of Santa Clara, Calif.

Tools 37, 38 and 39 are linked to the repository 32 by means of an XML component 41 ("Extended Markup Language"), which is disposed within the Client 27. XML is typically used to enable access, via the internet protocol, to information stored in databases (e.g., databases 33, 34, and 35). Moreover, tools 38 and 39 may be coupled to another XML tool 41, which is disposed within the server 28 for running server component tools of the framework, e.g., UML, RDB, etc. XML is typically used for message exchanging in the proper format.

The XML component 40 is linked to two models within the repository 32. The first is a relational database ("RDB") model 43 and the second is a Unified Modeling Language ("UML") model 44. The UML model 44 is based upon a set of analysis and design notations, which are becoming a de-facto industry standard for Object Oriented Analysis and Design. Another exemplary model, SCM model 46, is also illustrated within the repository 32. The SCM model 46 is based upon Select Component Manager, which is a tool that manages components.

At development time, it can be appreciated from the above that any model can be accessed by any tool within the framework, including legacy integration tools allowing modification, update and management of the system. Note also that the Client and Server may be heterogeneous, that is they may be completely different or without interrelation or may be from different manufacturers.

One of the primary advantages of the present invention is the ability to allow applications to evolve in order to provide new or enhanced functionality. Hence, the system disclosed and claimed herein are derived from the basic principles involved in the process of evolution. Evolution occurs when something develops in a new direction. In an engineering environment, evolution takes place through a deliberate process of recovery, that is the discovery and abstraction of existing assets by reverse engineering. Once the assets are recovered, they can be developed into new applications by forward engineering. The process repeats itself, thereby forming a cycle that may be entered at any point.

Figure 3A:
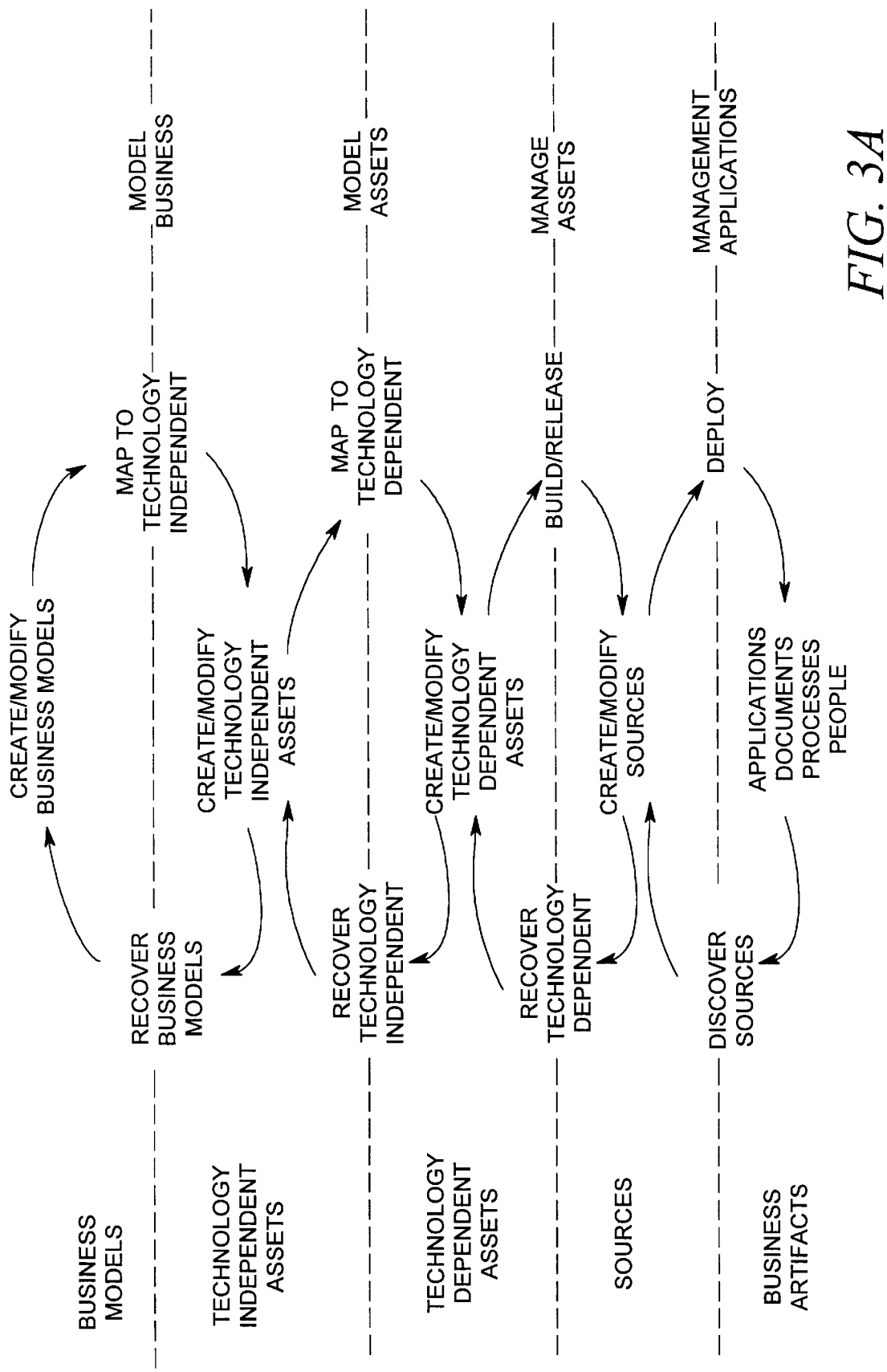
FIGS. 3A and 3B are conceptual diagrams of the evolution and development process implemented by the system of the present invention.
Figure 3B:
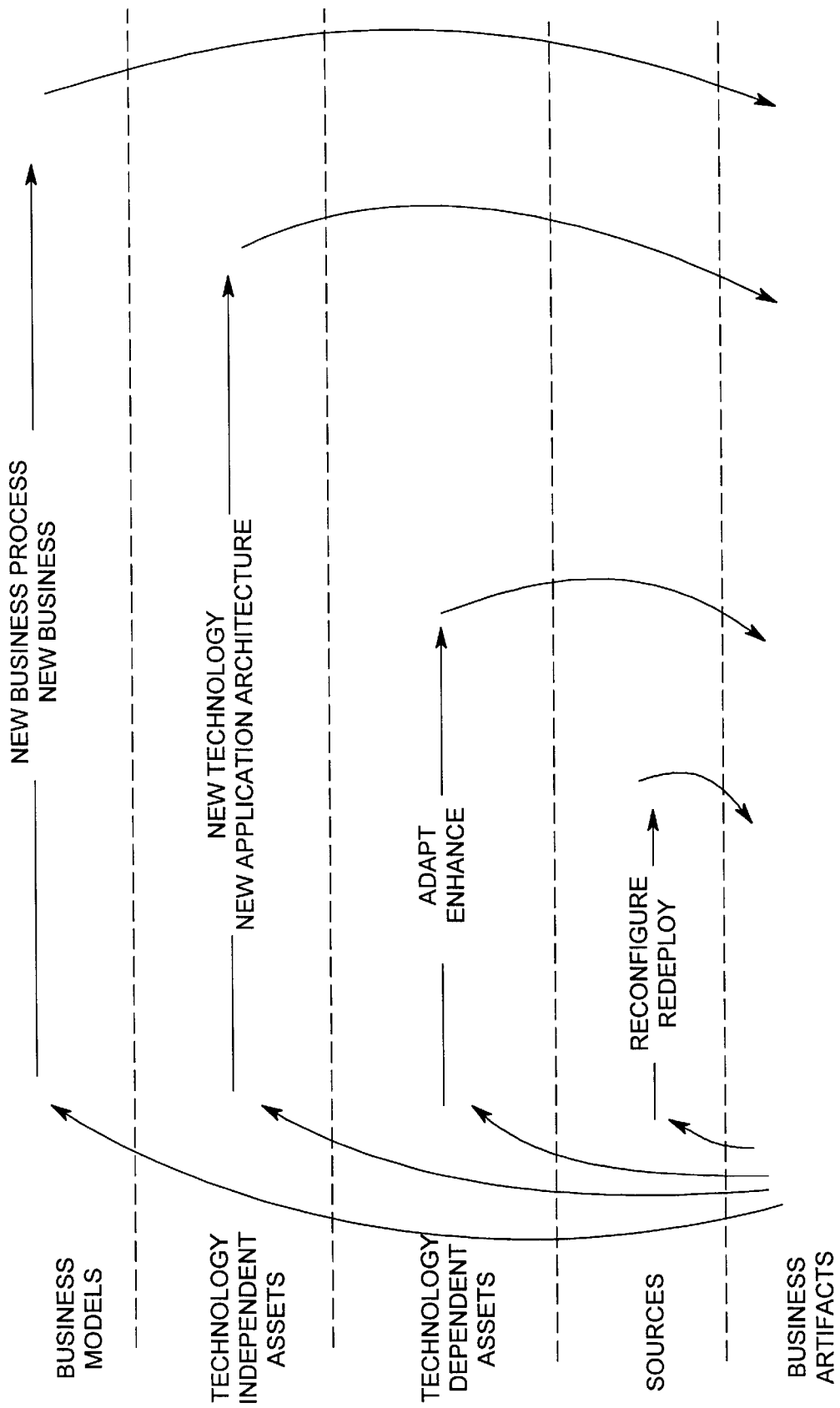

The concepts set forth above can be seen by reference to FIGS. 3A and 3B. The system of the present invention defines five layers: Business Models, Technology Independent Assets, Technology Dependent Assets, Applications and Business Artifacts. These layers are identified along the left hand side of both FIGS. 3A and 3B. To understand the scope of the term Business Model it is important to understand the term business domain. A business domain is defined as an entity in an organization that accomplishes specific tasks for proper working of the organization as a whole. Examples of business domains are sales department, human resource department, or the information technology department. A typical business domain generally comprises a wide range of functionalities, which in aggregation form the overall functions of a business domain. A clearly defined coherent description of such functionalities are called business models. They are the building blocks of an organization. Examples of Business Models can be the recruiting function of HR, the Intranet maintenance function of IT and the forecasting function of sales. A Business Model includes descriptions of people's roles, processes and procedures, and business rules.

A business asset is defined as a particular aspect of a business, such as workflow, rules, components, transaction, database, people, strategy, laws, etc. Depending on whether an asset is independent of or dependent upon technology, they are classified as Technology Dependent and Technology Independent assets. Examples of Technology Independent assets are people and strategy while that of Technology Dependent assets are databases and workflow.

A Business Artifact is defined as any of the things required to operate an enterprise, including programs, models, business rules, documentation, procedures and interactions. Artifacts are produced, for example, as part of the application development life cycle.

Since there are five layers, there are four boundaries (or stages) between them that represent the different stages of the application development process. Each of the four stages (shown on the right hand side of FIG. 3A) has its own set of Recover/Reconstruct, Create/Modify and Map/Specialize tools. At the lower levels, the reverse engineering process is primarily the discovery of applications, i.e., the locating and cataloging of existing business artifacts. At the middle layers, it is primarily recovery (both technology dependent and independent) - the abstraction of assets into less specialized models. At the higher layers, it is primarily reconstruction - the process of combining information about applications, processes and people into enterprise models.

An important concept is that, in general, the further an application needs to evolve, the further up into the layers the process needs to go. For example, simply reconfiguring or redeploying an application needs very little abstraction. More serious adaptation or enhancement of an application, but still using the same environment (same language, same operating system, same database, etc.), requires more abstraction into some form of technology-dependent modeling. Changing technologies or application architecture requires a further step of abstraction - the application must be made independent of the old technology before evolving into the new. Finally, re-engineering an entire business process requires abstracting all the way up to a model of the existing process before it can evolve.

Figure 4:
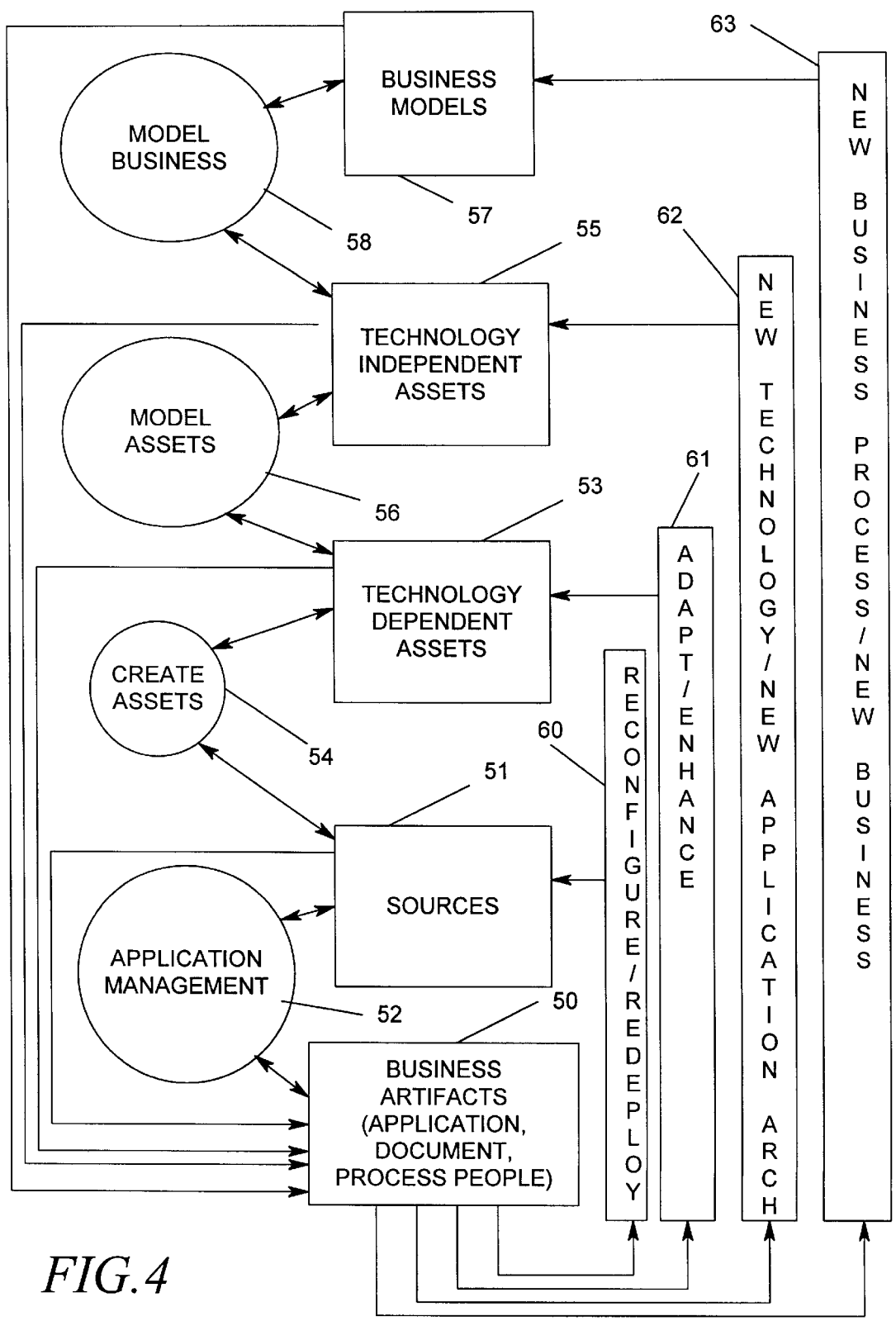
FIG. 4 is a process flow diagram of a method of the present invention.

With reference to FIG. 4, the first of the five layers, Business Artifacts, is depicted by a block 50 and the second layer, Applications, is depicted by a block 51. The first of the four stages is Application Management, as depicted by a circle 52. The third layer, Technology Dependent Assets, is depicted by a block 53 and the second stage, Create Assets, is depicted by a circle 54. The fourth layer, Technology Independent Assets, is depicted by a block 55 and the third stage, Model Assets, is depicted by a circle 56. The fifth layer, Business Models, is depicted by a block 57 and the fourth stage, Model Business, is depicted by a circle 58.

Reconfiguring or redeploying an application needs very little abstraction, as alluded to earlier. This cycle of the process occurs within the Applications layer 51, the Application Management stage 52 and the Business Artifacts layer 50 by linking through a reconfigure/redeploy path (block 60). An adaptation or enhancement of an application, while still using the same environment, requires the use of the Technology Dependent Assets 53, the Create Assets stage 54 and those layers and stages below by linking through an Adapt/Enhance path (block 61). When the application must be made independent of the old technology before evolving into the new, requires the use of the Technology Independent Assets level 55, the Model Assets stage 56 and those layers and stages below, by linking through a New Technology/New Application Architecture path (block 62). For re-engineering an entire business process, the Business Models layer 57, the Model Business stage 58 and all the layers and stages below are required. This latter cycle is completed by linking through the New Business Process/New Business path (block 63).

Figure 5:
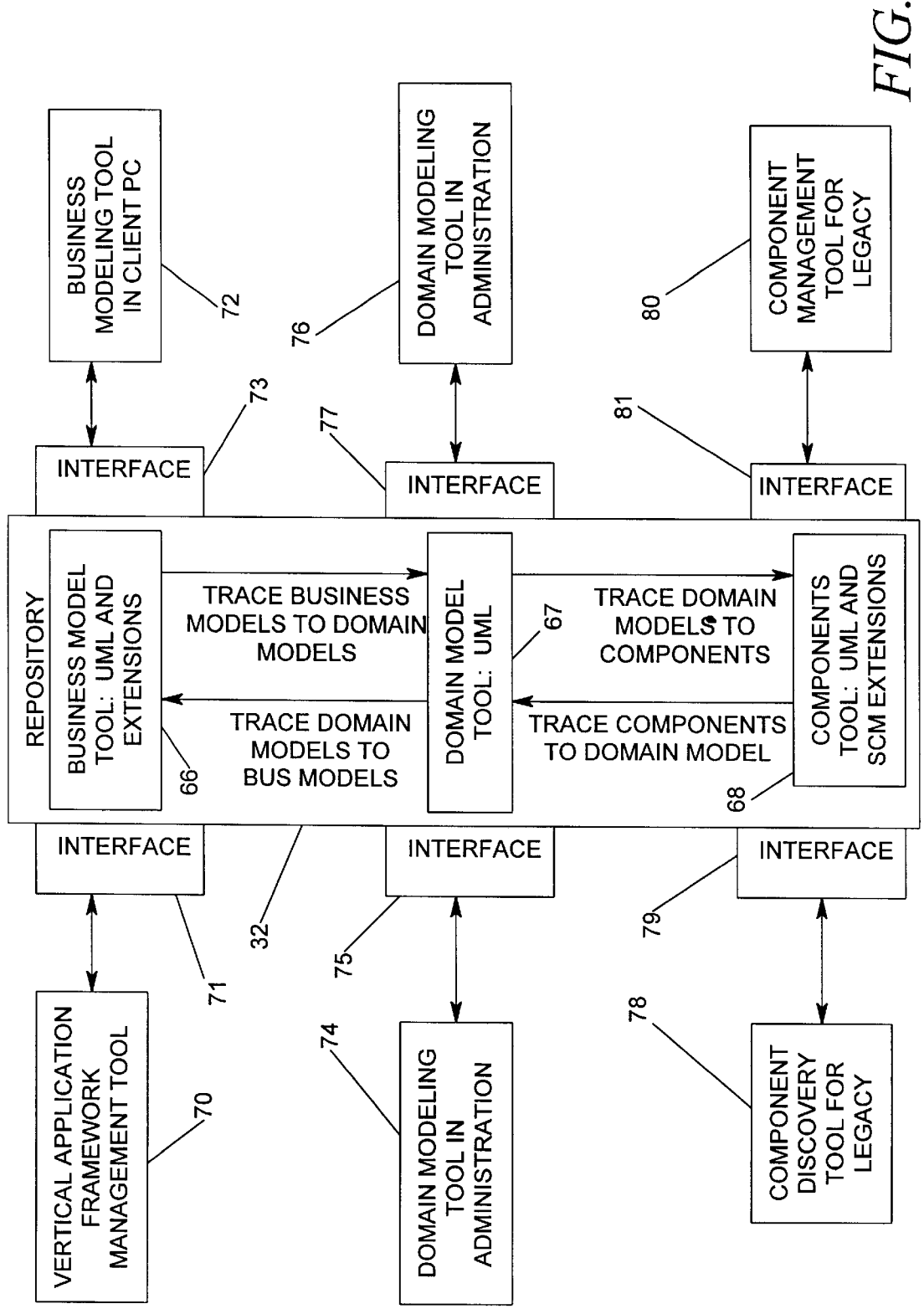
FIG. 5 is a block diagram showing the interrelationships of the modules making up the business modeling development framework of the present invention.

Referring now to FIG. 5, the interrelationships of the modules making up the development framework of the present invention are shown in a block diagram. Included within the repository 32 is a Business Model module 66. As noted, the module 66 may be written in UML with extensions, which will be amplified hereinafter. Also, there is shown a Domain Model module 67, which may also be written in UML. Finally, there is shown a Components module 68, also written in UML with SCM Extensions. Examples of the tools 36 through 39 (FIG. 2) are illustrated in FIG. 5 as follows. A Vertical Applications Framework Management Tool 70 is coupled to the repository 32 by means of an interface 71. The Vertical Application Framework Management Tool 70 may typically comprise tools such as the SAP R/3 application suite, which is available from SAP AG of Walldorf, Germany, or PeopleSoft HRMS packages available from PeopleSoft of Pleasanton, Calif. A Business Modeling Tool in a Client PC 72 is coupled to the repository 32 by means of an interface 73. The Business Modeling Tool 72 may typically comprise a Select Enterprise, which is available from Select Software Tools, Ltd.

A Domain Modeling Tool in Administration 74 is coupled to the repository 32 by means of an interface 75. A second Domain Modeling Tool in Administration 76 is coupled to the repository 32 by means of an interface 77. The Domain Modeling Tools 74 and 76 may typically comprise any available database for which a domain model exists in the repository. A Component Discovery Tool for Legacy 78 is coupled to the repository 32 by means of an interface 79. A Component Discovery Tool, which may be useful for Legacy 78, is available from the assignee hereof. Legacy 78 is a software tool that discovers component descriptions for legacy applications and imports them into the repository 32. Finally, a Component Management Tool for Legacy 80 is coupled to the repository 32 by means of an interface 81. The Component Management Tool for Legacy 80 may typically comprise Select Component Manager, which is available from Select Software Tools, Ltd.

The interfaces 71, 73, 75, 77, 79 and 81 are typically an XML tool (see 40 and 41, FIG. 2) or a tool wrapper. A tool wrapper useful in practicing the present invention is disclosed the above-cited co-pending patent application Ser. No. 09/156,029, entitled A METHOD AND SYSTEM FOR INTERFACING TO A VARIETY OF SOFTWARE DEVELOPMENT TOOLS.

A major advantage of the system of the present invention is the ability to link or trace from the Business Model 66 to the Domain Model 67, or to link or trace from the Domain Model 67 to the Components module 68. Also, this system can link or trace back from the Components module 68 to the Domain Model 67 or from the Domain Model 67 to the Business Model 66. In particular, the method of this invention provides traceability of the Business Models to the Domain Models, or traceability of the Domain Models to the Components. In a similar manner, the method provides traceability of the Components to the Domain Models or the Domain Models to the Business Models.

Figure 6:
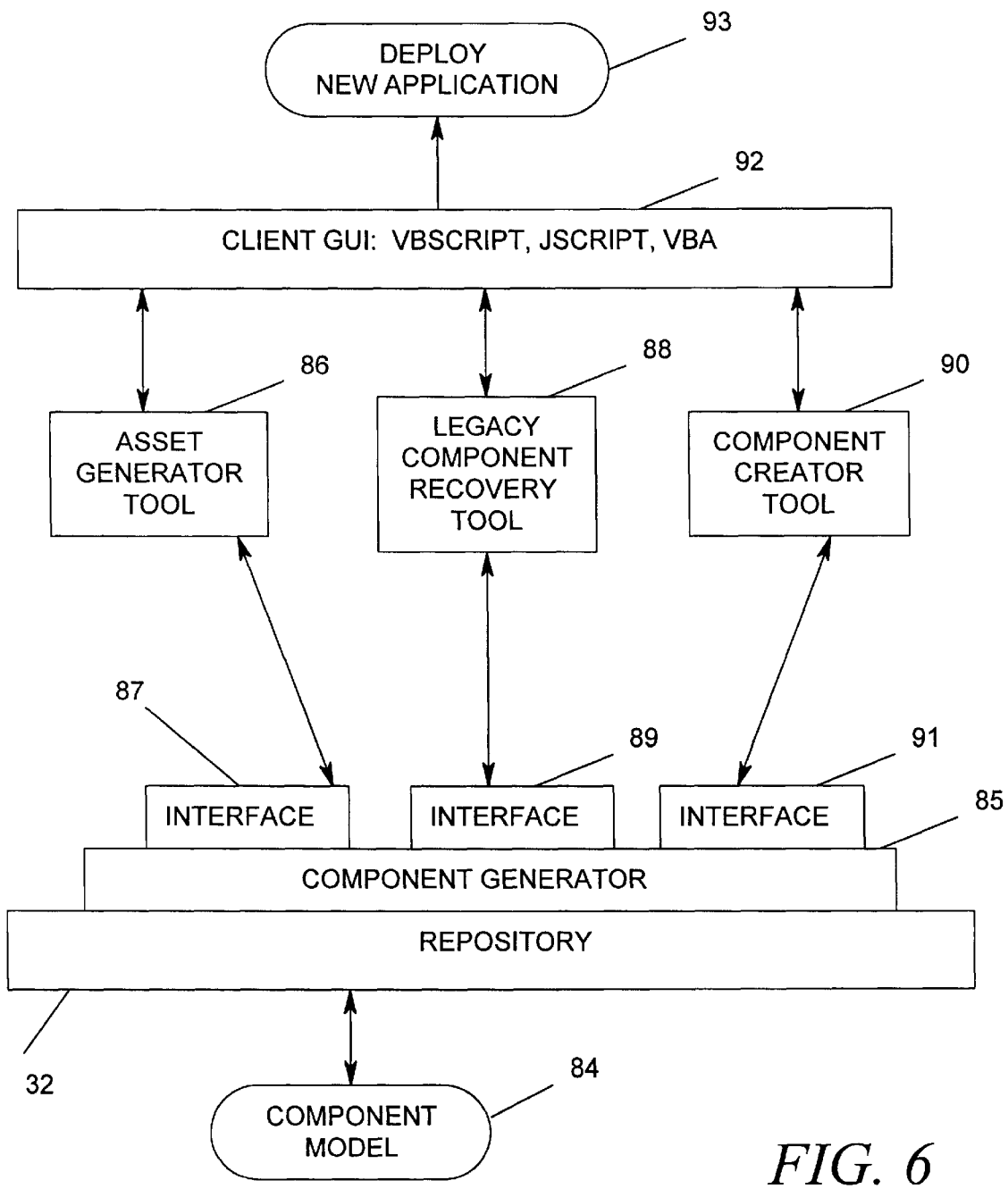
FIG. 6 is a block diagram of the asset modeling development framework of the present invention.

Referring now to FIG. 6, the asset modeling development framework of the present invention is shown. The repository 32 has coupled thereto a component model 84. A component generator 85 is also coupled to the repository 32, which is a "conductor" of the build process. Further amplification of the component generator 85 may be had by reference to the above-cited co-pending patent application Ser. No. 09/156,026, entitled A METHOD AND SYSTEM FOR BUILDING COMPONENTS IN A FRAMEWORK USEFUL IN DEVELOPING INTEGRATED BUSINESS CENTRIC APPLICATIONS. The generator 85 can effect updates to the Component Model 84. For example, the application under development may require certain additions or changes to the Model. Also, the generator 85 generates an interface to the various tools. An asset generator tool 86 is linked to the component generator 85 through an interface 87. The asset generator tool helps build new asset objects in the Component Model 84 through the repository 32. Next, a legacy component recovery tool 88 is linked to the component generator 85 by means of another interface 89. The recovery tool 88 contacts legacy components and links them to the Component Model 84. A component creator tool 90 is linked to the component generator 85 by means of an interface 91. The component creator tool 90 helps build new components and links them to the Component Model 84.

At this juncture, a user working at a client station through a GUI (i.e., Graphic User Interface) 92 actually develops a new application using the assets in the database and the models in the repository 32. After this, the new application is deployed as depicted by a bubble 93.

Figure 7:
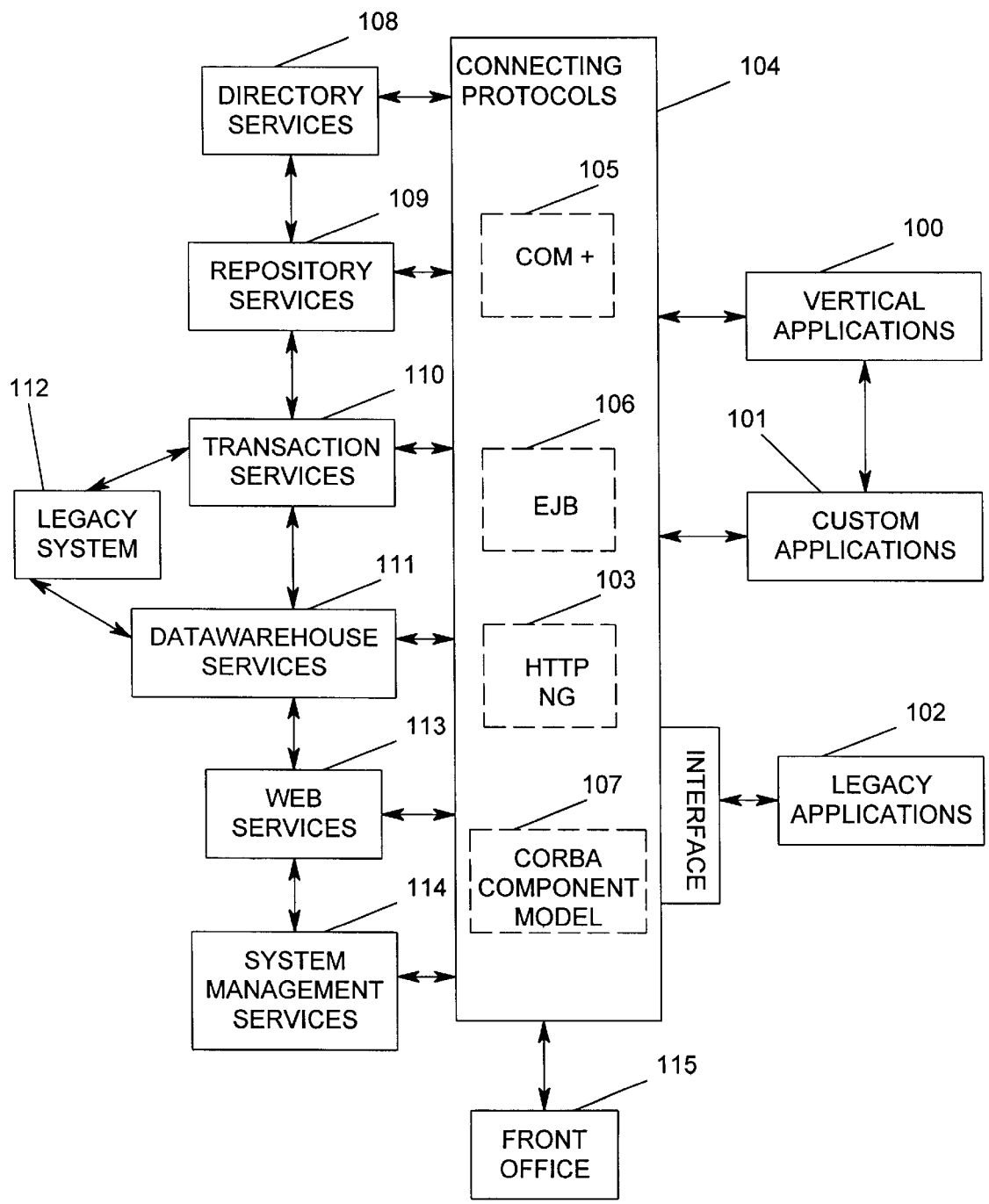
FIG. 7 is a block diagram of the execution-time architecture of the present invention.

Referring now to FIG. 7, a block diagram of the execution-time architecture of the present invention is shown. At this juncture, the facts of an environment have been collected and used to build an application. Examples of such an application are vertical applications 100, custom applications 101 or legacy applications 102. Connecting Protocols 104 disposed between the Services and the Applications are used for exchanging messages between the applications (e.g., Vertical Applications 100, Custom Applications 101 and Legacy Applications 102). A first example of the Protocols 104 is COM+ 105, which is an evolution of the COM protocol from Microsoft Corporation of Redmond, WA. Another example is Enterprise Java Beans 106, which is available from Sun Microsystems of Mountain View, Calif. Other similar connecting protocols may be employed in a like manner such as HTTP NG 103 or a CORBA Component Model 107.

Within the Server are a variety of services. First, there are Directory Services 108, which is an internal system service for file maintenance. For further information about the Directory Services reference is made to the above-cited co-pending patent application Ser. No. 09/154,613, entitled A METHOD AND SYSTEM FOR MONITORING AND CAPTURING ALL FILE USAGE OF A SOFTWARE TOOL. Next, there are Repository Services 109. Examples of the latter are Name Service, Composite Object Service, Version Service, Metadata Service, etc. See the aforementioned patents and applications relating to the repository 32. Transaction Services 110 are used for any transaction over the framework and can use a transaction server like MTS of Microsoft Corporation. Reference is made to the above-cited co-pending patent application Ser. No. 09/156,027, entitled A METHOD AND SYSTEM FOR CONTROLLING AND TRACKING CLIENT ACCESS TO SERVER SOFTWARE. Data-warehouse Services 111 are used for storing data, which may be accessed by the method of the present invention. Note that a Legacy System 112 is linked to the Protocols 104 by means of the Transaction Services 110 or the Data-warehouse Services 111.

In addition to the above, Web Services 113 and System Management Services 114 are linked to the Protocols 104 for any services over the internet and can use Internet Information Server, which is amplified in the above-cited co-pending patent application Ser. No. 09/156,027, entitled A METHOD AND SYSTEM FOR CONTROLLING AND TRACKING CLIENT ACCESS TO SERVER SOFTWARE. Finally, a so-called Front Office 115 is linked to the Protocols 104 to handle user screens and tool manipulation.

Figure 8A:
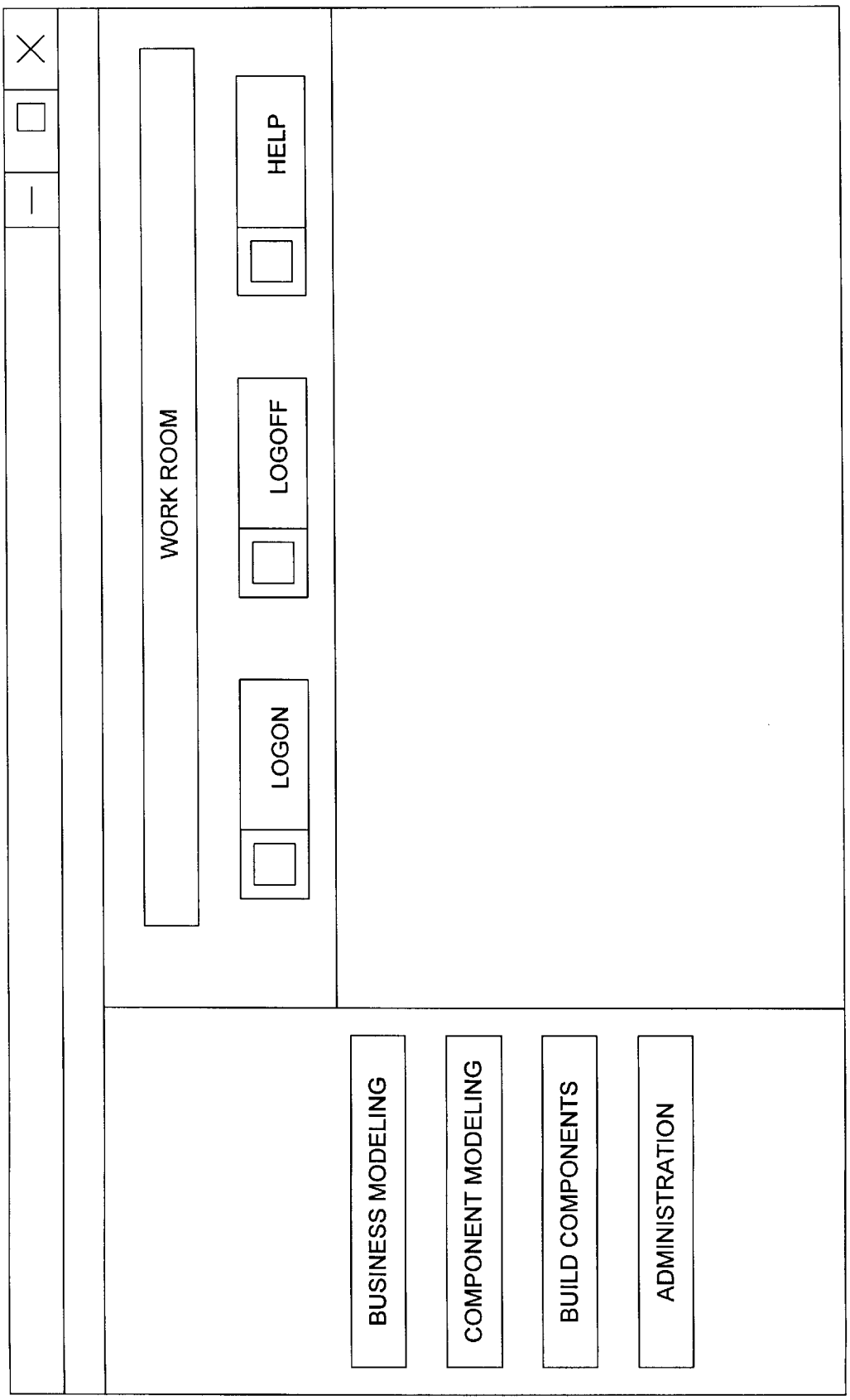
FIGS. 8A through 8F illustrate top-level screens for the user during operation of the process.
Figure 8B:
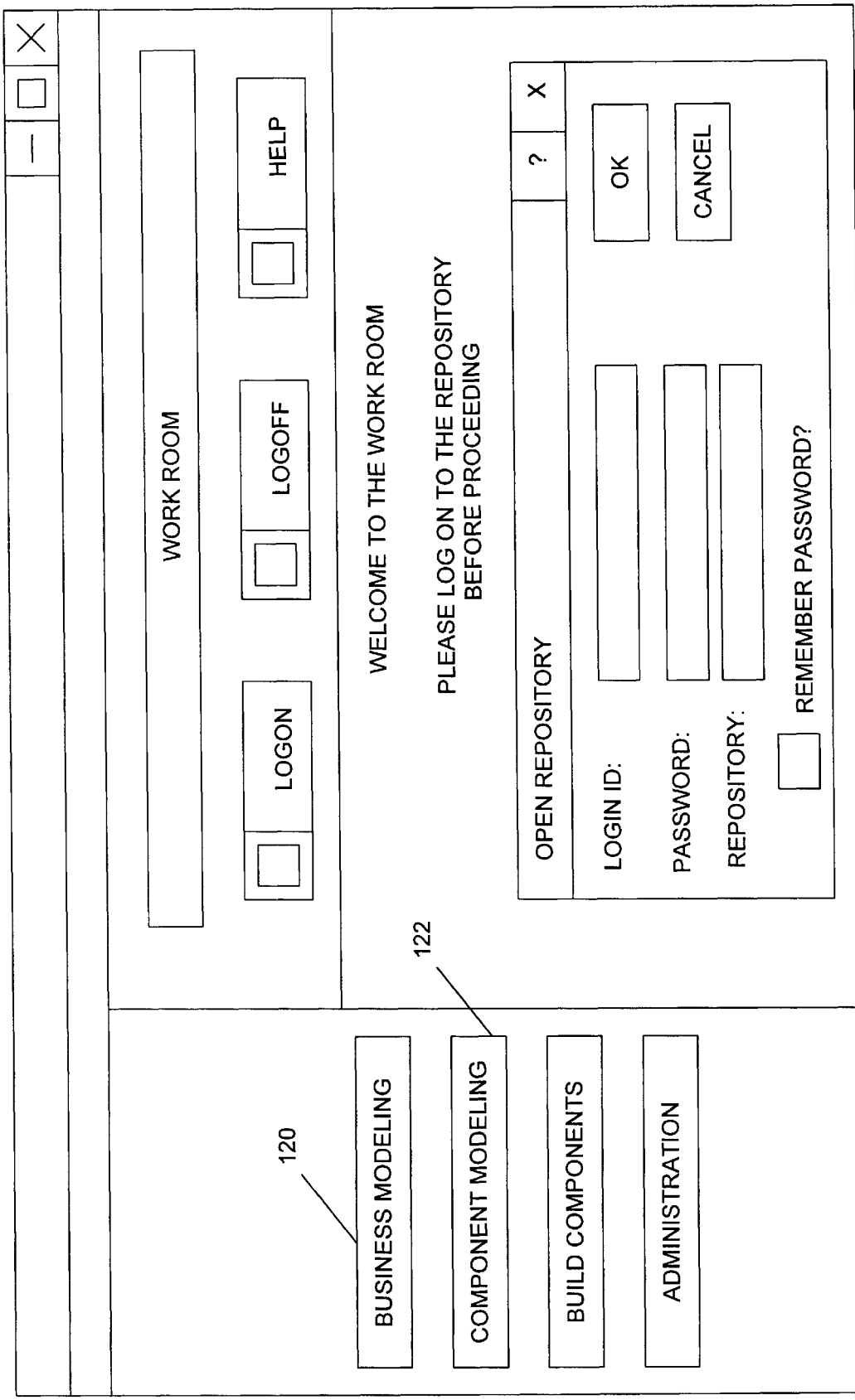
Figure 8C:
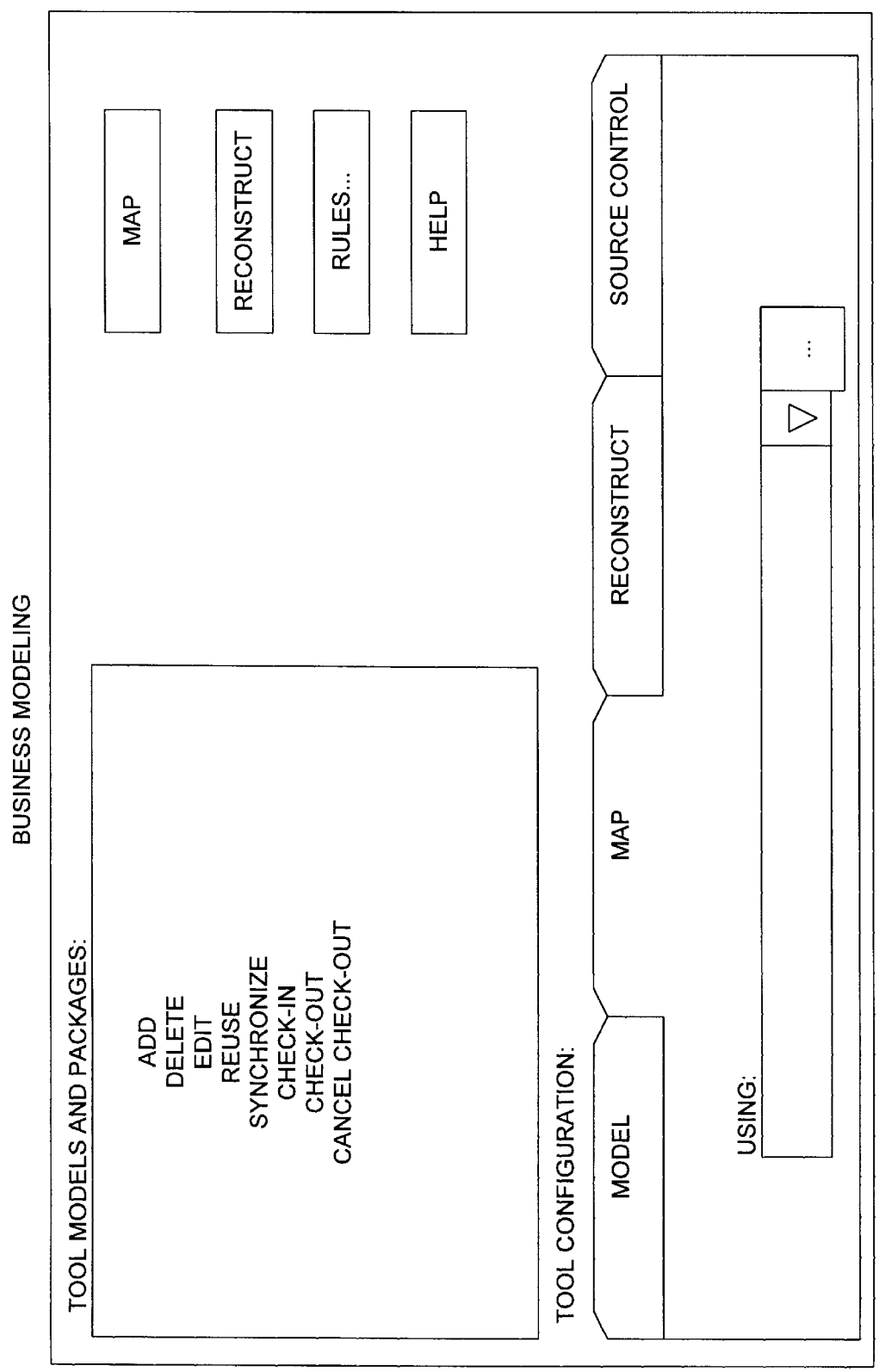
Figure 8D:
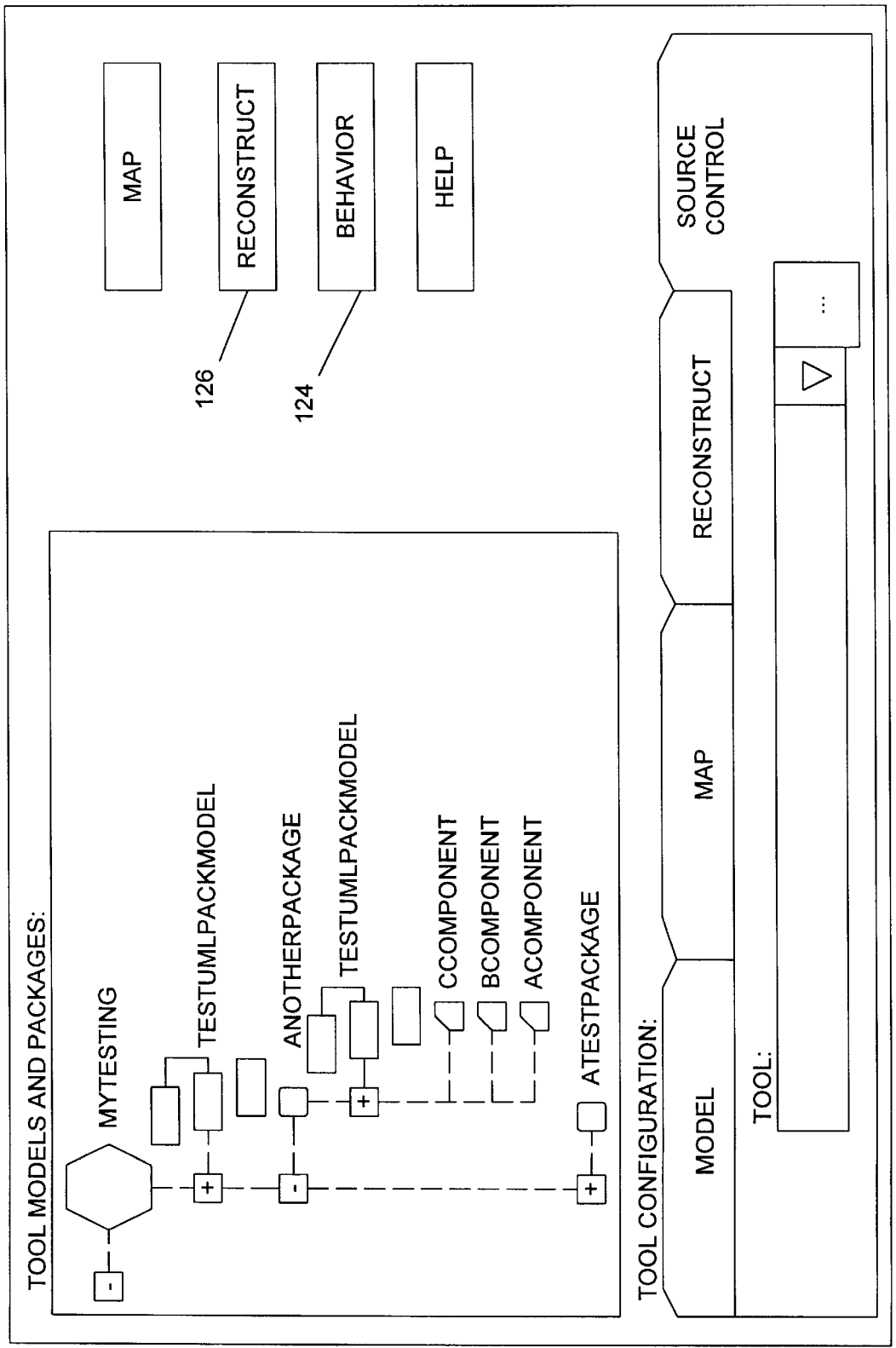
Figure 8E:
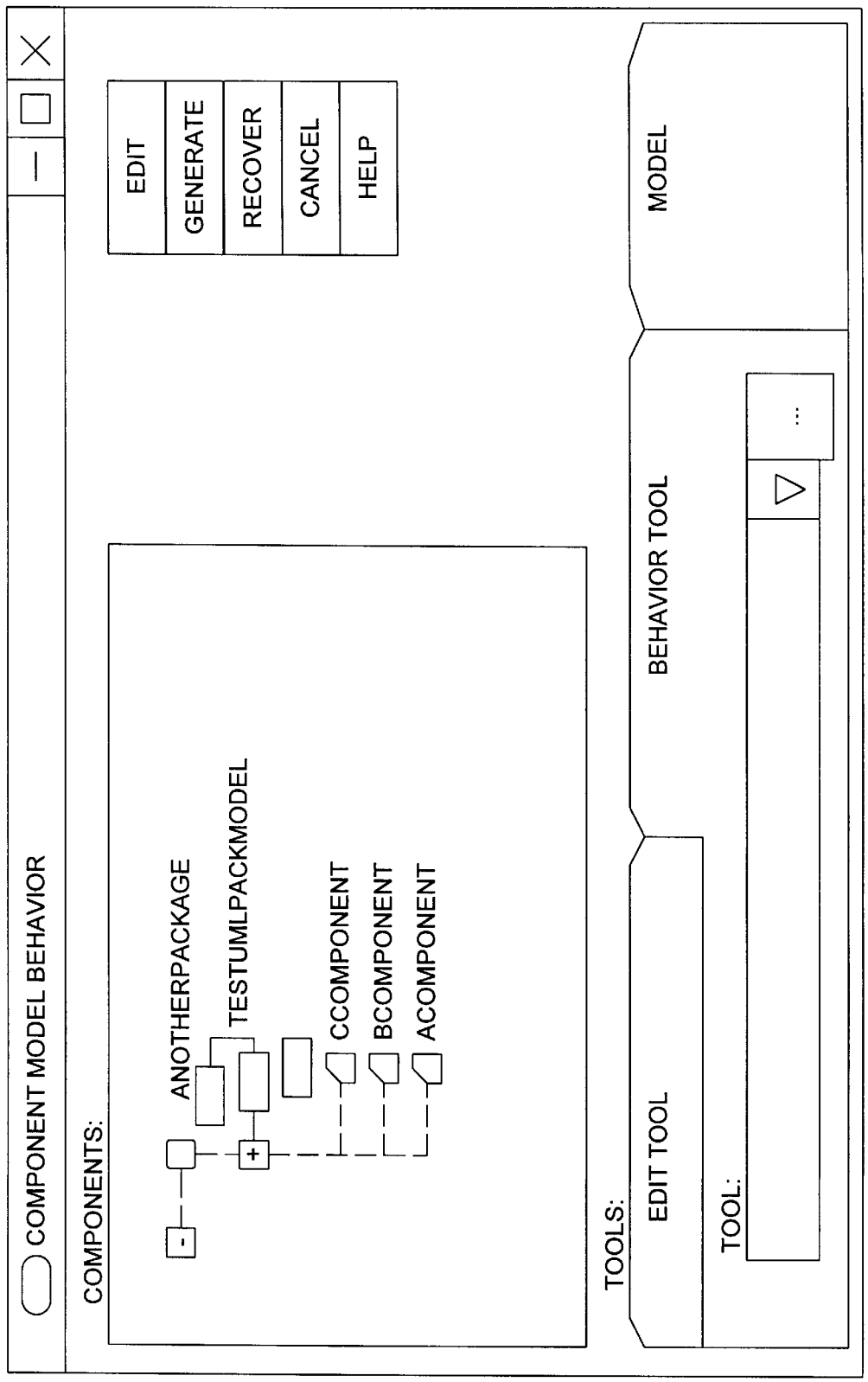
Figure 8F:
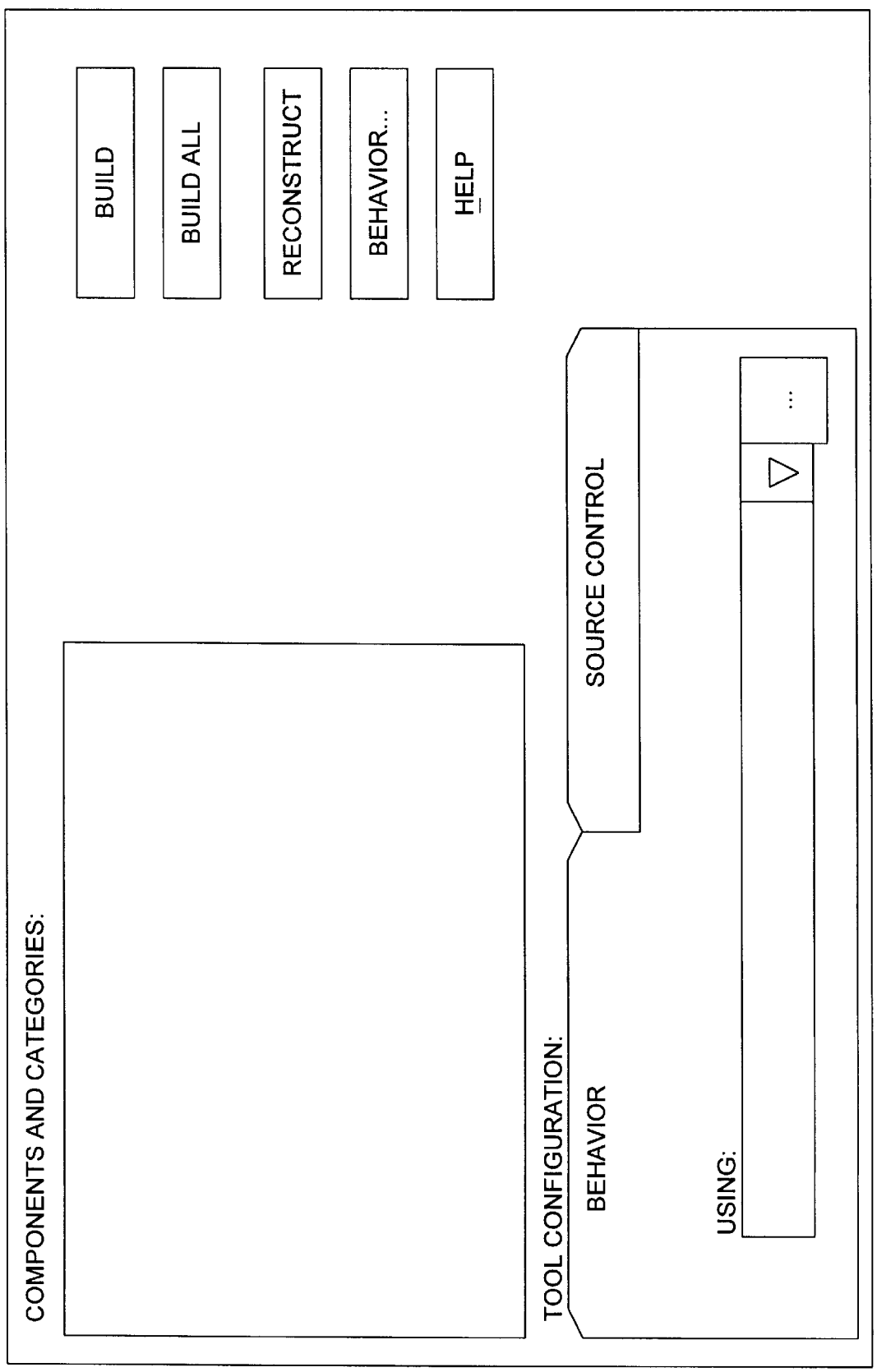

Referring now to FIGS. 8A through 8F, a series of top-level screens for the workroom, as viewed by a user, are shown for the tool time process. FIG. 8A illustrates the basic screen that appears after system initialization. FIG. 8B illustrates the Log On screen, wherein a user enters a LogIn ID and a Password to gain access to the framework and the repository. FIG. 8C illustrates the screen for business modeling, which appears if the user clicks on the Business Modeling button 120 (FIG. 8B). FIG. 8D illustrates the screen for components, which would appear if the user clicks on the Component Modeling button 122 (FIG. 8B). FIG. 8E illustrates the screen for Component Model Behavior, which would appear if a user clicks on the Behavior button 124 (FIG. 8D). FIG. 8F illustrates the build screen, which appear if a user clicks on the Reconstruct button 126 (FIG. 8D).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer system having a repository program being executed therein and a framework for integrating software development tools into said system, for building, deploying and maintaining applications in a heterogeneous development framework, said framework comprising:

a. a first module disposed for representing business models derived from a business modeling tool;

b. a second module disposed for holding information assets;

c. means for tracing origin of a first newly developed business model in said first module to a first newly developed domain model in said second module and linking said business model to said domain model in said repository;

d. a third module containing a multiplicity of component interfaces useful in building applications;

e. means for tracing constituent components of a second newly developed domain model in said third module to a newly developed set of components created in a process of building and deploying new applications and linking both of them together in said repository;

f. means for recovering constituent components from an existing system in a first heterogeneous environment and reconstructing said constituent components into usable components inside a third newly developed domain model and linking said constituent components and said third newly developed domain model together in said repository; and, g. means for recovering a first previously built domain model from a second heterogeneous environment and linking it to a second newly developed business model in said repository.

* * * * *